United States Patent
Chen et al.

(10) Patent No.: US 9,001,907 B2
(45) Date of Patent: *Apr. 7, 2015

(54) MULTI-RANK PRECODING MATRIX INDICATOR (PMI) FEEDBACK IN A MULTIPLE-INPUT MULTIPLE-OUTPUT (MIMO) SYSTEM

(71) Applicants: Runhua Chen, Dallas, TX (US); Eko N. Onggosanusi, Allen, TX (US)

(72) Inventors: Runhua Chen, Dallas, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,882

(22) Filed: Sep. 3, 2013

(65) Prior Publication Data

US 2014/0169287 A1    Jun. 19, 2014

Related U.S. Application Data

(63) Continuation of application No. 12/967,739, filed on Dec. 14, 2010, now Pat. No. 8,526,519.

(60) Provisional application No. 61/286,237, filed on Dec. 14, 2009.

(51) Int. Cl.
| H04K 1/10 | (2006.01) |
| H04L 27/28 | (2006.01) |
| H04B 7/04 | (2006.01) |
| H04L 25/03 | (2006.01) |

(52) U.S. Cl.
CPC ........ *H04B 7/0486* (2013.01); *H04L 25/03343* (2013.01); *H04B 7/0452* (2013.01)

(58) Field of Classification Search
CPC .. H04B 7/0413; H04B 7/0452; H04B 7/0456; H04B 7/0486; H04B 7/02; H04B 7/00; H04B 7/0417; H04B 7/0639
USPC .......... 375/224, 228, 259–260, 267, 295, 299
See application file for complete search history.

(56) References Cited

U.S. PATENT DOCUMENTS

| 7,813,458 | B2 | 10/2010 | VanWaes et al. |
| 2008/0013610 | A1 | 1/2008 | Varadarajan et al. |
| 2008/0043867 | A1 | 2/2008 | Blanz et al. |
| 2008/0170523 | A1 | 7/2008 | Han et al. |
| 2008/0192849 | A1 | 8/2008 | Kim et al. |
| 2008/0225962 | A1 | 9/2008 | Zhou et al. |

(Continued)

OTHER PUBLICATIONS

3rd Generation Partnership Project; "Further Advancements for E-UTRA Physical Layer Aspects", Technical Specification Group Radio Access Network, 3GPP TR 36.814 V1.5.0, Release 9, Nov. 2009, pp. 1-53 (http://www.3gpp.org).

*Primary Examiner* — Jena B Corrielus
(74) *Attorney, Agent, or Firm* — David Denker; Frank D. Cimino (57) ABSTRACT

In at least some embodiments, a system includes a multiple-input multiple-output (MIMO) base station and a plurality of MIMO user equipment (UE) devices in communication with the MIMO base station. The MIMO base station is configured to switch between a single-user (SU)-MIMO mode and a multiple-user (MU)-MIMO mode during communications with the plurality of MIMO UE devices based on multi-rank precoding matrix indicator (PMI) feedback received from at least one of the MIMO UE devices.

9 Claims, 5 Drawing Sheets

(56) References Cited

U.S. PATENT DOCUMENTS

| | | |
|---|---|---|
| 2009/0006518 A1 | 1/2009 | Van Rensburg |
| 2009/0017769 A1 | 1/2009 | Chen et al. |
| 2009/0034639 A1 | 2/2009 | Hwang et al. |
| 2009/0103486 A1 | 4/2009 | Hunukumbure et al. |
| 2009/0212700 A1 | 8/2009 | Masoud et al. |
| 2009/0238298 A1 | 9/2009 | Kim et al. |
| 2010/0002598 A1 | 1/2010 | Pan et al. |
| 2010/0188966 A1 | 7/2010 | Pun et al. |
| 2010/0195594 A1 | 8/2010 | Seo et al. |
| 2010/0215110 A1 | 8/2010 | Onggosanusi et al. |
| 2010/0215112 A1 | 8/2010 | Tsai et al. |
| 2010/0238913 A1 | 9/2010 | Xia et al. |
| 2011/0080965 A1 | 4/2011 | Liu et al. |
| 2011/0194504 A1 | 8/2011 | Gorokhov et al. |
| 2012/0201321 A1* | 8/2012 | Koivisto et al. ............... 375/267 |

* cited by examiner

MULTI-RANK PRECODING MATRIX INDICATOR (PMI) FEEDBACK IN A MULTIPLE-INPUT MULTIPLE-OUTPUT (MIMO) SYSTEM

CROSS-REFERENCE TO RELATED APPLICATIONS

This application is a continuation of Ser. No. 12/967,739 filed Dec. 14, 2010, now issued as U.S. Pat. No. 8,526,519, which claims priority to provisional application no. 61/286,237 filed Dec. 14, 2009 and entitled "Multi-Rank PMI/CQI Feedback for DL SU/MU-MIMO". These documents are hereby incorporated herein by reference as if reproduced in their entirety.

BACKGROUND

Multiple-input multiple-output (MIMO) wireless systems are those that have multiple antennas on the transmitter side and the receiver side. One way to exploit the number of antennas in a MIMO wireless system is referred to as "spatial multiplexing", where different data streams are transmitted in parallel from different transmit antennas and where multiple receive antennas are used to separate the different data streams and the receiver. With spatial multiplexing, a node (eNB) may send multiple data streams (or layers) to user equipment (UEs) in downlink transmission using the same frequency. The number of such layers or streams for a downlink transmission is referred to as "the rank". In Long Term Evolution (LTE) Release 8 standard, each UE estimates the downlink (DL) channel and reports the recommended rank indicator (RI) to eNB. Each UE also reports the channel quality indicator (CQI) and the precoding matrix indicator (PMI) which is an index to the precoding matrix in a codebook. These indicators provide a set of recommended transmission properties to eNB. Upon receiving this feedback (RI/PMI/CQI) from UEs, the eNB performs corresponding downlink MIMO transmission scheduling.

Implicit CSI (CQI/PMI/RI) feedback is based on a predefined set of codebooks, which are a set of matrices calculated offline and known at the eNB and UEs. The codebook of rank-r consists of a number of Nt×r matrices where Nt is the number of eNB transmit antennas. The UE feedback includes the RI, PMI and CQI mentioned above. RI refers to a preferred transmission rank (number of data streams), ranging from 1 to min(Nt,Nr), where Nr is the number of receive antennas. PMI refers to a UE recommended precoding matrix index in the rank-r codebook. For evolved UMTS Terrestrial Radio Access (E-UTRA) LTE Release 8, a single PMI is reported for each frequency subband, corresponding to the RI report. CQI refers to the quality of the channel (e.g., supportable data rate and/or signal-to-noise ratio). The reported CQI is associated with the reported PMI.

SUMMARY

In at least some embodiments, a system includes a multiple-input multiple-output (MIMO) base station and a plurality of MIMO user equipment (UE) devices in communication with the MIMO base station. The MIMO base station is configured to switch between a single-user (SU)-MIMO mode and a multiple-user (MU)-MIMO mode during communications with the plurality of MIMO UE devices based on multi-rank precoding matrix indicator (PMI) feedback received from at least one of the MIMO UE devices.

In accordance with at least some embodiments, an electronic device includes MIMO transceiver logic and multi-rank precoding matrix indicator (PMI) feedback reporting logic coupled to the MIMO transceiver logic. The multi-rank PMI feedback reporting logic enables the electronic device to selectively switch between a single-user (SU)-MIMO mode and a multiple-user (MU)-MIMO mode.

In accordance with at least some embodiments, a method includes receiving, by a MIMO base station, multi-rank precoding matrix indicator (PMI) feedback from user equipment (UE) devices. The method also includes switching, by the MIMO base station, between a single-user (SU)-MIMO mode and a multiple-user (MU)-MIMO mode for communications with the UE devices based on the received multi-rank PMI feedback.

BRIEF DESCRIPTION OF THE DRAWINGS

For a detailed description of exemplary embodiments of the invention, reference will now be made to the accompanying drawings in which.

DETAILED DESCRIPTION

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

Embodiments of the invention are directed to the use of multi-rank precoding matrix indicator (PMI) feedback reports in a multiple-input multiple-output (MIMO) wireless communication system (e.g., a system with a MIMO base station and a plurality of user equipment (UE) devices). The multi-rank PMI feedback reports are used, for example, to schedule switches between a single-user (SU)-MIMO mode and a multi-user (MU)-MIMO mode for the wireless communication system. In at least some embodiments, MIMO UE devices generate the multi-rank PMI feedback reports and a MIMO base station selectively switches between a SU-MIMO mode and a MU-MIMO mode based on received multi-rank PMI feedback reports. The types of multi-rank PMI feedback reports used with the wireless communication system may vary and may be adjusted from time to time.

Enhanced DL MU-MIMO with non-codebook-based precoding has shown significant performance improvement in a highly loaded scenario with full-buffer traffic. Disclosed embodiments expand on LTE Release 8 CQI/PMI feedback techniques. More specifically, PMI information can be expanded to include multiple PMIs (e.g., addition of best companion and/or worst companion) and/or additional information (e.g., long-term transmit covariance). Further, codebook enhancements such as adaptive/downloadable codebooks (based on antenna configuration, propagation environment, or other parameters) and/or differential codebook structures may be implemented. Further, sounding reference signal (SRS) enhancements may be implemented. Further, CQI definitions may be modified.

In accordance with some embodiments, switching between SU-MIMO and MU-MIMO transmissions is possible without RRC configuration. SU-MIMO refers to a communication technique where a frequency resource block (RB) is occupied by a single UE exclusively at a particular time instant. On the other hand, MU-MIMO refers to a communication technique where an RB can be occupied by two or more UEs simultaneously at a given time.

In LTE Release 8, a UE is semi-statically configured in either a SU-MIMO or MU-MIMO mode by higher-layer RRC signaling. Further, switching between SU-MIMO and MU-MIMO mode occurs at a low rate and CSI report by the UE is only required to target the specific MIMO mode. In at least some embodiments, dynamic MIMO mode switching is used as part of an advanced wireless communication system. With dynamic mode switching, switching between SU-MIMO and MU-MIMO mode can occur more frequently (e.g., every subframe). Because the UE does not know a priori which MIMO mode is being used, UE feedback is implemented to facilitate downlink MIMO transmission. The UE feedback disclosed herein takes into account both SU-MIMO and MU-MIMO aspects in order to facilitate the dynamic switching and UE scheduling/pairing. This is in contrast to semi-static mode switching where UE feedback assumes either an SU or MU hypothesis.

To support dynamic SU/MU switching, implicit RI/PMI/CQI feedback can be implemented with minor modifications to LTE Release 8. With spatial multiplexing, the eNB may send multiple data streams (or layers) to UEs in downlink transmission using the same frequency. The number of such layers or streams is defined as the rank. For LTE Release 8, each UE needs to estimate the DL channel and report the recommended rank indicator (RI) to the eNB. Each UE also reports the channel quality indicator (CQI) and the precoding matrix indicator (PMI) which is an index to the precoding matrix in a codebook. These indicators form a set of recommended transmission properties (RI/PMI/CQI) to the eNB. Upon receiving this feedback from UE, the eNB performs corresponding downlink MIMO transmission scheduling.

In contrast, to support dynamic SU/MU switching, each UE can report implicit CSI for SU-MIMO and implicit CSI for MU-MIMO transmission simultaneously. This corresponds to at least two separate PMIs of different ranks. The rank-r PMI/CQI includes the preferred RI (rank-r) and PMI/CQI information under a SU-MIMO hypothesis. The rank-r PMI/CQI is used for the purpose of SU-MIMO scheduling, and is readily supported with LTE Release 8 feedback scheme. In addition, a further PMI belonging to a certain pre-defined/restricted rank value is reported which is applicable for MU-MIMO transmission. For example, when the restricted rank value is rank-1 (or rank-2), multi-rank PMI feedback may configure a UE to report additional rank-1 or rank-2 PMI for MU-MIMO beamforming and scheduling. Note the baseline PMI report (rank-r) without rank restriction is used for SU-MIMO transmission. Meanwhile, the rank-1 PMI/CQI and/or rank-2 PMI/CQI includes PMI/CQI information for a specified rank which the eNB will use to perform MU-MIMO transmission.

For instance, the UE may report rank-1 SU-MIMO PMI/CQI without any MU-MIMO hypothesis. Upon receiving the rank-1 SU-MIMO PMI/CQI from multiple users, the eNB performs MU-MIMO scheduling with regularized zero-forcing beamforming (ZFBF). In this example, the report is essentially a SU-MIMO PMI/CQI under a specific pre-defined rank, but is for the purpose of MU-MIMO scheduling. Although other ranks may be possible, 1-layer or 2-layer per UE is may be sufficient for most applications. For example, if MU-MIMO is to be confined to rank-1 per UE only, the multi-rank feedback reporting includes a rank-r PMI/CQI and a rank-1 PMI/CQI (depicted in FIG. 4A). Alternatively, if rank-2 transmission is also to be supported in MU-MIMO, a rank-2 PMI/CQI is reported together with the rank-1 PMI/CQI (depicted in FIG. 4B). Note the rank-1 PMI/CQI and rank-2 PMI/CQI can be reported in the same subframe or in different subframes. Yet as another embodiment, it is also possible that MU-MIMO transmission is confined to rank-2 transmission only. In this case two PMI/CQI will be reported: a rank-r SU-MIMO RI/PMI/CQI for SU-MIMO scheduling (as if there is no MU-MIMO), and a rank-2 PMI/CQI for MU-MIMO scheduling (depicted in FIG. 4C).

The disclosed scheme for multi-rank PMI feedback reporting enables the eNB to perform link adaptation and rate prediction when a UE is scheduled in SU-MIMO transmission. Further, the implicit CSI for MU-MIMO (rank-1) enables the eNB to schedule a UE in MU-MIMO transmission. Because the UE reports are essentially SU-MIMO PMI/CQI, very minimum standardization effort is needed for implementing multi-rank PMI feedback reporting. As an example, for 2TX (2 transmit antennas) and 4TX (4 transmit antennas), the LTE Release 8 feedback technique can be utilized without any extra standardization work. Further, all the PUSCH and PUCCH feedback modes in LTE Release 8 can be re-used. For 8TX, the 8TX codebook may be utilized. Further, the eNB may configure periodic or aperiodic report of rank-r and rank-1 PMI/CQI for SU/MU separately. Since MU-MIMO is more suitable for low-mobility UE with favorable channel condition (e.g., medium to high geometry), it is possible to configure the rank-1 PMI report (for MU-MIMO transmission) less frequently than the rank-r PMI report. For example, different reporting periodicities can be configured given the cell load and user traffic types. Alternatively, aperiodic feedback of MU-MIMO CSI can be triggered by UL grant when necessary.

In at least some embodiments, dynamic SU/MU switching can be turned off when not needed. For example, the eNB may "turn off" the rank-r (or rank-1 PMI) report by configuring the reporting periodicity to be lengthy (approaching infinity). By doing so, a UE can be configured to report PMI/CQI for a specific MIMO mode, and hence fall-back to a semi-static MU-MIMO or SU-MIMO transmission. Further, a UE can re-use any existing PMI/CQI feedback module without additional computational cost or complexity.

The configuration of multi-rank PMI/CQI feedback is semi-statically signaled by higher-layer signaling (e.g., by an RRC parameter referred to herein as "multirank-pmicqi-configuration") as given in Table 1.

TABLE 1

RRC configuration of multi-rank PMI/CQI Feedback Reporting

| multirank-pmicqi-configuration | PMI/CQI configuration | | | Notation |
|---|---|---|---|---|
| | Rank-r RI/PMI/CQI | Rank-1 PMI/CQI | Rank-2 PMI/CQI | |
| 0 | ON | OFF | OFF | SU only |
| 1 | ON | ON | OFF | SU + rank-1 MU |
| 2 | ON | OFF | ON | SU + rank-2 MU |
| 3 | ON | ON | ON | SU + rank-1 MU + rank-2 MU |
| 4 | OFF | OFF | OFF | No Feedback |
| 5 | OFF | ON | OFF | Rank-1 MU |
| 6 | OFF | OFF | ON | Rank-2 MU |
| 7 | OFF | ON | ON | rank-1 MU + rank-2 MU |
| 8 | Reserved | | | |

In case the preferred SU-MIMO rank r=1 or 2, the SU-MIMO PMI/CQI may be combined with the rank-1/2 PMI/CQI for MU-MIMO. As an example, if multirank-pmicqi-configuration=1, the UE reports the recommended RI=r for SU, and rank-1 for MU. If r is not 1, the UE reports 2 CQI/PMI pairs: rank-r+rank-1 PMI/CQI. If r=1, UE reports only the rank-1 CQI/PMI pair.

As another example, if multirank-pmicqi-configuration=2, the UE reports the recommended RI=r for SU, and rank-2 for MU. If r is not 2, the UE reports 2 CQI/PMI pairs: rank-r+rank-2 PMI/CQI. If r is 2, the UE reports only rank-2 CQI/PMI pair. As yet another example, if multirank-pmicqi-configuration=3, the UE reports the recommended RI=r for SU, and rank-1/2 for MU. If r is not 1 or 2, the UE reports 3 CQI/PMI pairs rank-r+rank-1+rank-2 PMI/CQI. If r is either 1 or 2, the UE reports only 2 CQI/PMI pairs: rank-1+rank-2 PMI/CQI. It is also possible to jointly configure rank-1 and rank-2 PMI/CQI reporting (for MU) by higher layer signaling (e.g., rank-1 and rank-2 PMI/CQI reporting is always ON or OFF simultaneously) in which case the RRC parameter multirank-pmicqi-configuration is provided in Table 2.

TABLE 2

RRC configuration of multi-rank PMI/CQI Feedback Reporting

| multirank-pmicqi-configuration | PMI/CQI configuration | | Notation |
|---|---|---|---|
| | Rank-r RI/PMI/CQI | Rank-1/2 PMI/CQI | |
| 0 | ON | OFF | SU only |
| 1 | ON | ON | SU + rank-1/2 MU |
| 2 | OFF | OFF | No Feedback |
| 3 | OFF | ON | rank-1/2 MU |
| 4 | reserved | | |

If multirank-pmicqi-configuration=1 and Table 2 is used, the UE reports the recommended RI=r for SU, and rank-1 PMI/CQI+rank-2 PMI/CQI for MU. If r is not 1 or 2, the UE reports 3 PMI/CQI pairs: rank-r+rank-1+rank-2 PMI/CQI. If r is either 1 or 2, UE reports only 2 CQI/PMI pairs: rank-1+rank-2 PMI/CQI. If multirank-pmicqi-configuration=3 and Table 2 is used, the UE reports rank-1 PMI/CQI+rank-2 PMI/CQI for MU. Alternatively, if MU-MIMO is to be confined to rank-1 transmission, the RRC configuration of multirank-pmicqi-configuration is given in Table 3.

TABLE 3

RRC configuration of multi-rank PMI/CQI Feedback Reporting

| multirank-pmicqi-configuration | PMI/CQI configuration | | Notation |
|---|---|---|---|
| | Rank-r RI/PMI/CQI | Rank-1 PMI/CQI | |
| 0 | ON | OFF | SU only |
| 1 | ON | ON | SU + rank-1 MU |
| 2 | OFF | OFF | No Feedback |
| 3 | OFF | ON | rank-1 MU |
| 4 | Reserved | | |

If multirank-pmicqi-configuration=1 and Table 3 is used, the UE reports the recommended RI=r for SU, and rank-1 PMI/CQI MU. If r is not 1, the UE reports 2 CQI/PMI pairs rank-r+rank-1 PMI/CQI. If r=1, the UE reports only 2 CQI/PMI pairs: rank-1 PMI/CQI. If multirank-pmicqi-configuration=3 and Table 3 is used, the UE reports rank-1 PMI/CQI for MU.

In yet another embodiment, if MU-MIMO is to be confined to rank-2 transmission only, the RRC configuration of multi-rank-pmicqi-configuration is given in Table 4.

TABLE 4

RRC configuration of multi-rank PMI/CQI Feedback Reporting

| Multirank-pmicqi-configuration | PMI/CQI configuration | | Notation |
|---|---|---|---|
| | Rank-r RI/PMI/CQI | Rank-2 PMI/CQI | |
| 0 | ON | OFF | SU only |
| 1 | ON | ON | SU + rank-2 MU |
| 2 | OFF | OFF | No Feedback |
| 3 | OFF | ON | rank-2 MU |
| 4 | Reserved | | |

If multirank-pmicqi-configuration=1 and Table 4 is used, the UE reports the recommended RI=r for SU, and rank-2 PMI/CQI for MU. If r is not 2, the UE reports rank-r PMI/CQI+rank-2 PMI/CQI. If r=2, the UE reports rank-2 PMI/CQI. If multirank-pmicqi-configuration=3 and Table 4 is used, the UE reports rank-2 PMI/CQI for MU. Regardless of the Table being used, the rank-value r is always reported together with the rank-r PMI/CQI for SU-MIMO transmission, except when r is equal to one of the configured rank values for PMI/CQI report for MU-MIMO (e.g., r=1 or r=2).

Figure 1:
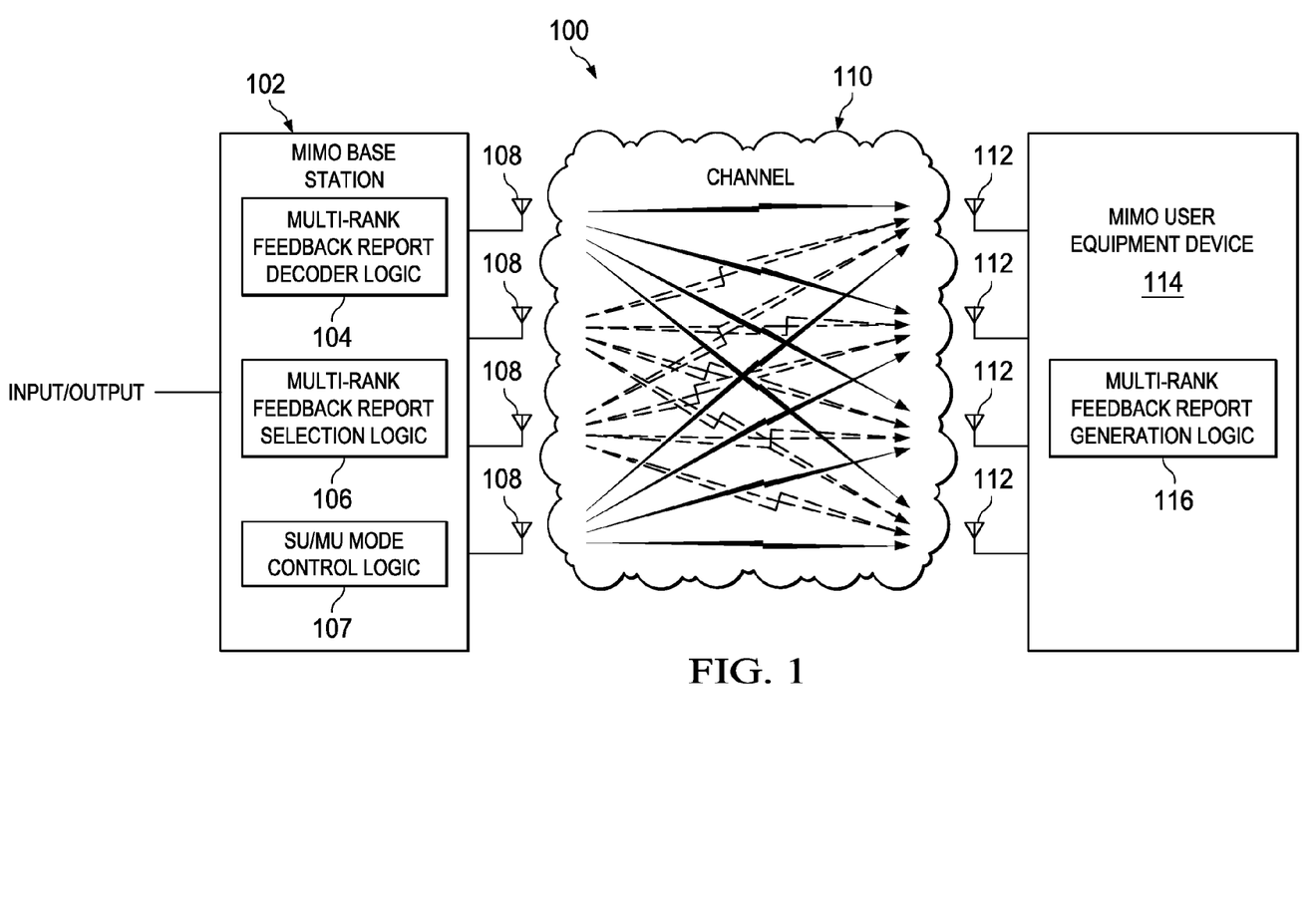
FIG. 1 shows an illustrative embodiment of a multiple-input multiple-output (MIMO) wireless communication system in accordance with an embodiment of the disclosure.

FIG. 1 shows an illustrative embodiment of a multiple-input multiple-output (MIMO) wireless communication system 100 in accordance with an embodiment of the disclosure. As shown, the wireless communication system 100 comprises a MIMO base station (eNB) 102 having a plurality of antennas 108 in communication with a MIMO UE device 114 having a plurality of antennas 112. The communication between the MIMO base station 102 and the MIMO UE device occurs via a communication channel 110. The number of antennas (108 and 112) used for communications between the MIMO base station 102 and the MIMO UE device 114 may vary over time. If one antenna is used by the transmitting device, one antenna is used by the receiving device. If two antennas are used by the transmitting device, two antennas are used by the receiving device, and so on. Although only one MIMO UE device 114 and one channel 110 is shown in FIG. 1, it should be understood that the wireless communication system 100 may include a plurality of MIMO UE devices and corresponding channels. Regardless of the number of UE devices in the MIMO wireless communication system 100, each UE device is configured to generate multi-rank PMI feedback reports as described herein.

In FIG. 1, the MIMO UE device 114 comprises multi-rank feedback report generation logic 116 that is able to generate the multi-rank PMI feedback reports described herein. Other MIMO UE devices of the wireless communication system 100 would likewise comprise multi-rank feedback report generation logic. In accordance with at least some embodiments, the multi-rank PMI feedback report generation logic 116 may be implemented as part of the UE device PHY layer and comprises hardware, or a combination of hardware and software. The report generated by the multi-rank PMI feedback report generation logic 116 may vary. For example, the MIMO UE device 114 may periodically or randomly receive a control signal that causes the multi-rank PMI feedback report generation logic 116 to vary one or more features of reports generated by the multi-rank PMI feedback report generation logic 116. The control signal may be, for example, a Radio Resource Control (RRC) configuration signal.

In at least some embodiments, the multi-rank PMI feedback report generated by the PMI feedback report generation logic 116 comprises a rank-r rank indicator (RI) and at least one other pre-defined/restricted RI (e.g., rank-1 and/or rank-2). Additionally, the multi-rank PMI feedback report comprises rank-r PMI information and rank-1 and/or rank-2 PMI information. The rank-r PMI information is used to schedule SU-MIMO transmissions, where r is the preferred SU-MIMO rank. Meanwhile, the rank-1 and/or rank-2 PMI information is used to schedule MU-MIMO transmissions. In at least some embodiments, Zero Forcing Beamforming (ZFBF) is used for MU-MIMO transmissions. The multi-rank PMI feedback report also may comprise channel quality indication (CQI) information as described herein.

The multi-rank PMI or the rank-restricted PMI (e.g. rank-1 PMI) for MU-MIMO transmission may be reported periodically, wherein the reporting periodicity of the multi-rank/rank-restricted PMI may be larger than that of the regular rank-r PMI/CQI. In at least some embodiments, the multi-rank PMI feedback report generation logic 116 enables the UE device 114 to send a multi-rank PMI feedback report to the MIMO base station 102, where the multi-rank PMI feedback report includes multiple RIs in the same report. Alternatively, the UE device 114 sends multiple single-rank PMI feedback reports to the MIMO base station 102, where multi-rank reporting is accomplished by sending a series of single-rank PMI feedback reports. In one embodiment of multi-rank PMI feedback reporting, a series of single-rank PMI feedback reports includes two or more rank-r PMI feedback reports followed by a rank-1 PMI and/or rank-2 PMI feedback report. In other words, for multi-rank PMI feedback reporting where a series of single-rank PMI feedback reports are sent, rank-r PMI feedback reports may be sent more often than rank-1 and/or rank-2 feedback reports. Each UE device may repeat the process of sending a multi-rank PMI feedback report and/or sending a series of single-rank PMI feedback reports as needed.

In FIG. 1, the MIMO base station 102 comprises multi-rank feedback report decoder logic 104 that is able to decode multi-rank PMI feedback reports and/or a series of single-rank PMI feedback reports. With the decoded information, SU/MU mode control logic 107 is able to schedule when an SU-MIMO mode and an MU-MIMO mode is used for communications with UE devices of the wireless communication system 100. As needed (in accordance with the schedule derived from multi-rank PMI feedback reporting), the SU/MU mode control logic 107 enables dynamic switching between the SU-MIMO mode and the MU-MIMO mode.

The MIMO base station 102 also comprises multi-rank feedback report selection logic 106 that enables selection and adjustment of the type of multi-rank PMI feedback reporting to be used. For example, the multi-rank feedback report selection logic 106 may generate control signals (e.g., RRC configuration signals) to cause each UE device of the wireless communication system 100 to perform one of multiple types of multi-rank PMI feedback reporting. The types of multi-rank PMI feedback reporting are based on different multi-rank PMI feedback reports and/or a series of single-rank PMI feedback reports generated by UE devices in accordance with a control signal. The multi-rank feedback report selection logic 106 also may communicate with the multi-rank feedback report decoder logic 104 to ensure decoding compatibility when the type of multi-rank PMI feedback reporting is adjusted.

Figure 2:
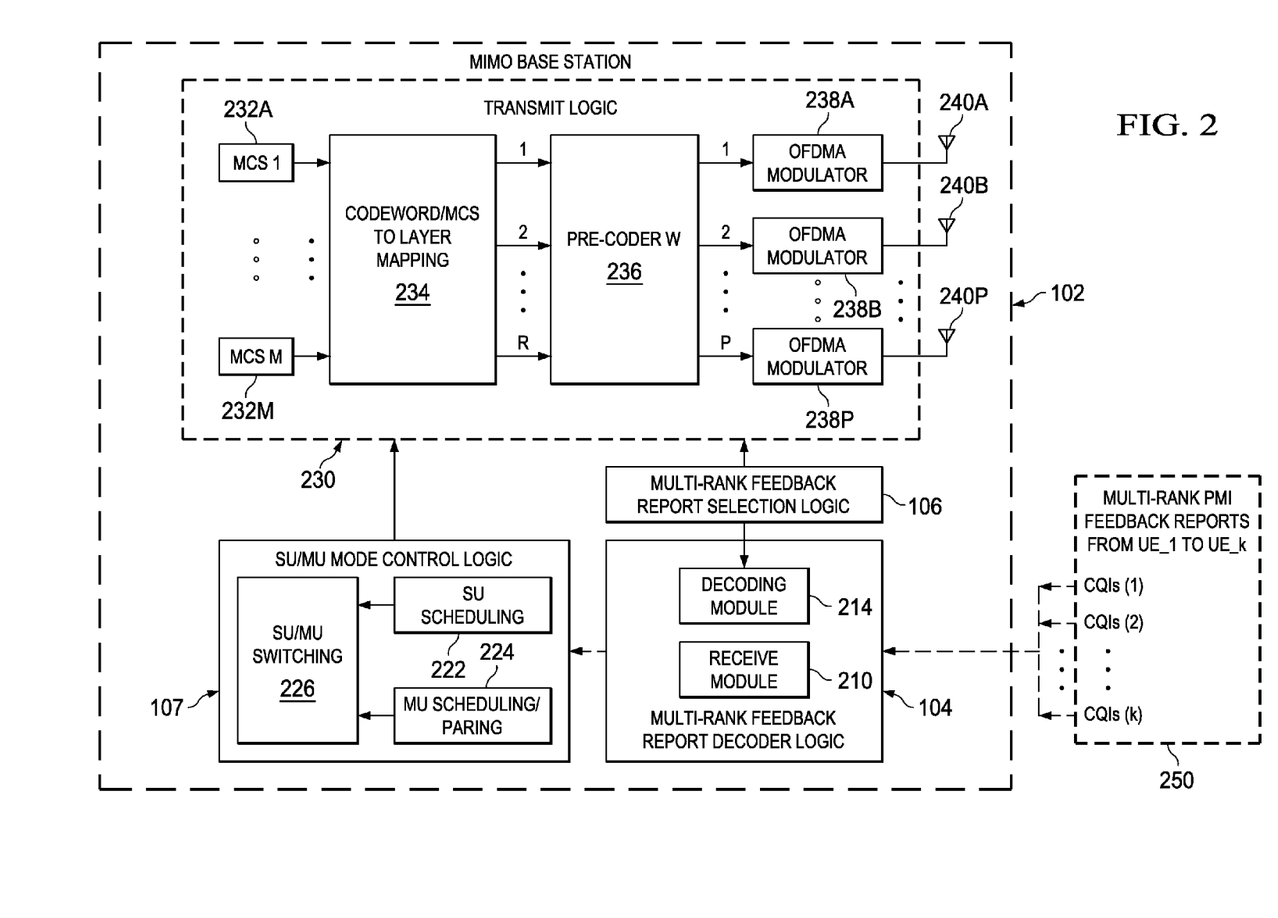
FIG. 2 shows additional components of the MIMO base station of FIG. 1 in accordance with an embodiment of the disclosure.

FIG. 2 shows additional components of the MIMO base station 102 of FIG. 1 in accordance with an embodiment of the disclosure. As shown in FIG. 2, the multi-rank feedback report decoder logic 104 comprises a receive module 210 that receives multi-rank PMI feedback reports 250 from multiple UEs (e.g., UE_1 to UE_k), where the multi-rank PMI feedback reports 250 include CQIs estimated by the multiple UEs. The multi-rank feedback report decoder logic 104 also comprises a decoding module 214 that extracts RI/PMI/CQI information from the multi-rank PMI feedback reports 250. The extracted RI/PMI/CQI information is forwarded to SU/MU mode control logic 107, which comprises SU scheduling logic 222 and MU scheduling/pairing logic 224. The SU scheduling logic 222 operates to schedule SU communications using rank-r RI information extracted from the multi-rank PMI feedback reports 250. Meanwhile, the MU scheduling/pairing logic 224 operates to schedule MU communications using rank-1 and/or rank-2 RI information extracted from the multi-rank PMI feedback reports 250. The SU/MU switching logic 226 determines when to switch between an SU-MIMO mode and an MU-MIMO mode based on SU and MU schedule information received from the SU scheduling logic 222 and MU scheduling/pairing logic 224.

The MIMO base station 102 also comprises transmit logic 230 coupled to the SU/MU mode control logic 107 and the multi-rank feedback report selection logic 106. The transmit logic 230 operates to prepare data transmissions and/or control signal transmissions to MIMO UEs. In at least some embodiments, the transmit logic 230 operates in SU-MIMO mode or MU-MIMO mode according to a SU/MU mode control signal received from the SU/MU mode control logic 107. The transmit logic also may receive information from the multi-rank feedback report selection logic 106 regarding which type of multi-rank feedback reporting is to be used and may transmit a corresponding control signal to the MIMO UEs.

As shown, the transmit logic 230 comprises a plurality of modulation-coding scheme (MCS) components 232A-232M corresponding to SU-MIMO mode operations, MU-MIMO mode operations and/or other operations common to SU-MIMO mode and MU-MIMO mode. Each MCS component 232A-232M is operable to receive input data and to output modulated data or codewords. The modulated data or codewords are provided to a codeword/MCS to layer mapping component 234 that maps the received data onto one more layers (each layer corresponding to the number of antennas that will be used to transmit the data). The layers may be understood to be virtual antennas.

In at least some embodiments, the output of the codeword/MCS to layer mapping component 234 is provided to pre-coder 236 which converts virtual antenna signals to physical antennas signals (e.g., 1 to 4 antennas may be selected for use). In accordance with at least some embodiments, the signal on each of the physical antennas 240A-240P correspond to some combination of the signals on the virtual antennas. This mapping can be specified by a precoding matrix implemented by pre-coder 236. The output of the pre-coder 236 is assembled in the frequency domain and converted to the time domain using the OFDMA modulators 238A-238P, which may add a cyclic prefix to guard against channel distortion. The output from the OFDMA modulators 238A-238P is provided to antennas 240A-240P for transmission. For MU-MIMO the output of pre-coder 236 will be summed up for every UE device, and the summation will be fed into OFDMA modulators 238A-238P.

Figure 3:
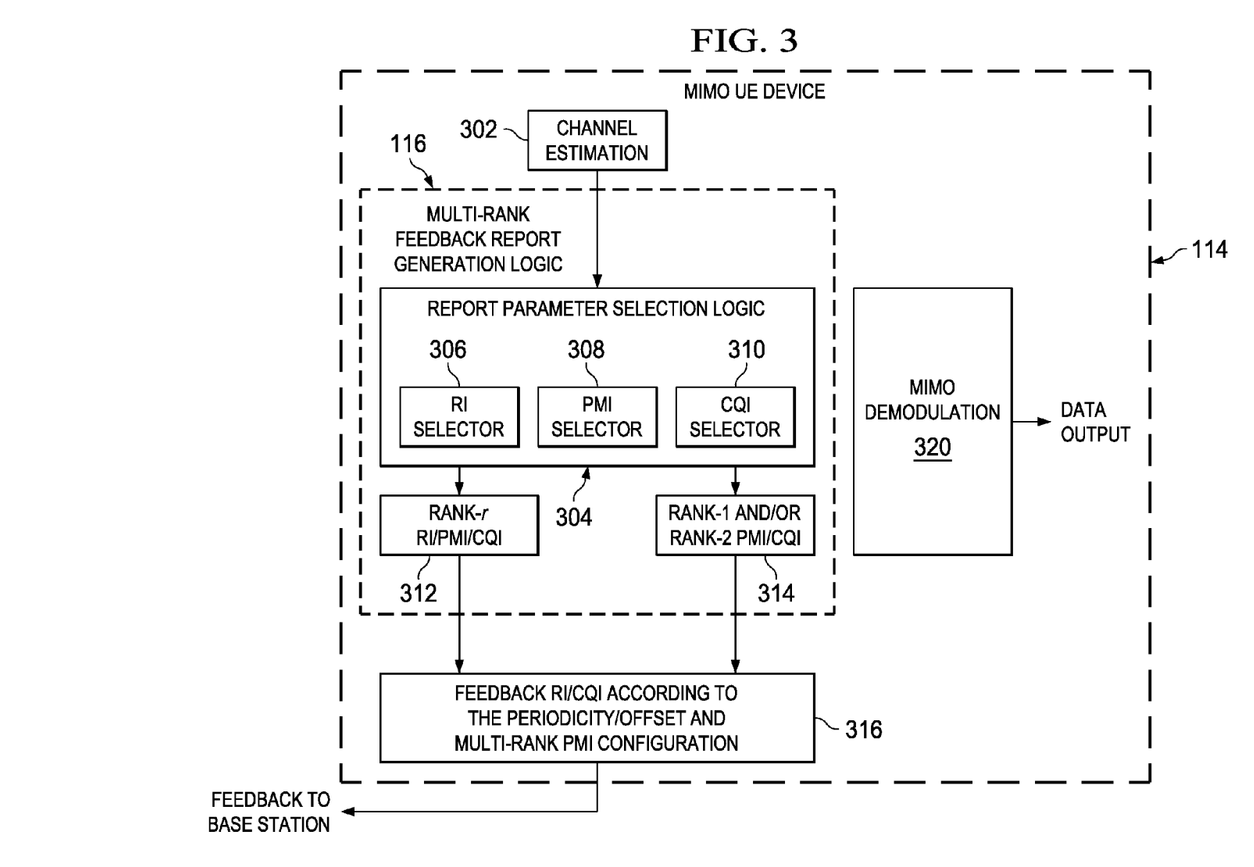
FIG. 3 shows additional components of the MIMO user equipment (UE) device of FIG. 1 in accordance with an embodiment of the disclosure.

FIG. 3 shows additional components of the MIMO UE device 114 of FIG. 1 in accordance with an embodiment of the disclosure. As shown, the MIMO UE device 114 may comprise a channel estimation component 302 that operates to estimate how the communication channel affects transmitted signals. The output of the channel estimation component 302 is provided to multi-rank feedback report generation logic 116. In FIG. 3, the multi-rank feedback report generation logic 116 comprises report parameter selection logic 304 configured to select parameters for reports that are generated. As an example, the report parameter selection logic 304 comprises RI selector logic 306 for selecting at least one RI for a report, PMI selector logic 308 for selecting at least one PMI for a report, and CQI selector logic 310 for selecting at least one CQI for a report. In at least some embodiments, rank-r RI/PMI/CQI information 312 is output from the report parameter selection logic 304. Additionally or alternatively, rank-1 or rank-2 RI/PMI/CQI information 314 is output from the report parameter selection logic 304. The rank-r RI/PMI/CQI information 312 and/or the rank-1 or rank-2 RI/PMI/CQI information 314 is combined in a report 316, which provides RI/CQI feedback according to the periodicity/offset and multi-rank PMI configuration. The report 316 is transmitted to the MIMO base station 102 for use in scheduling and switching between SU-MIMO mode and MU-MIMO mode as described herein. As shown in FIG. 3, the MIMO UE device 114 also comprises MIMO demodulation logic 320 that demodulates data received from the base station 102. The demodulation logic 302 operates, in part, based on a configurable number of antennas used for MIMO communications between the base station 102 and the MIMO UE device 114.

Figure 4A:
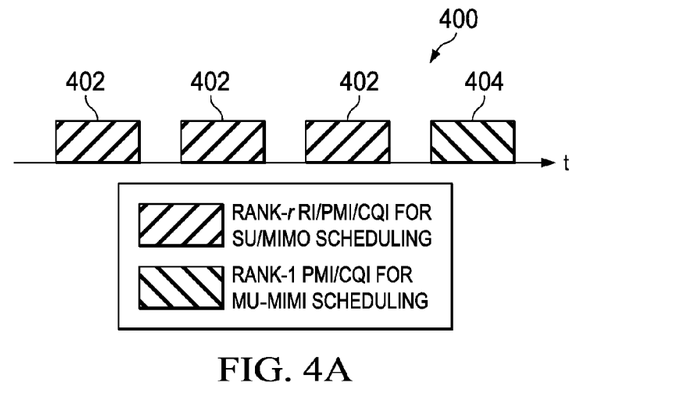
FIGS. 4A-4C show time charts for multi-rank precoding matrix indicator (PMI) feedback reporting in accordance with embodiments of the disclosure.
Figure 4B:
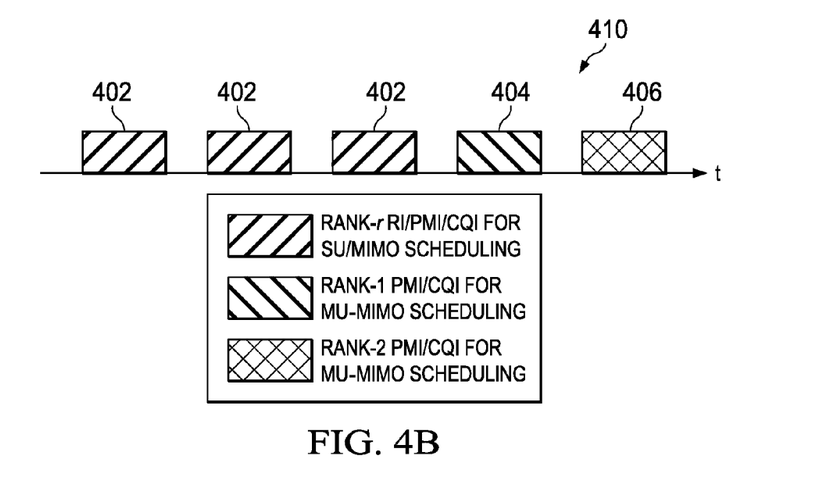
Figure 4C:
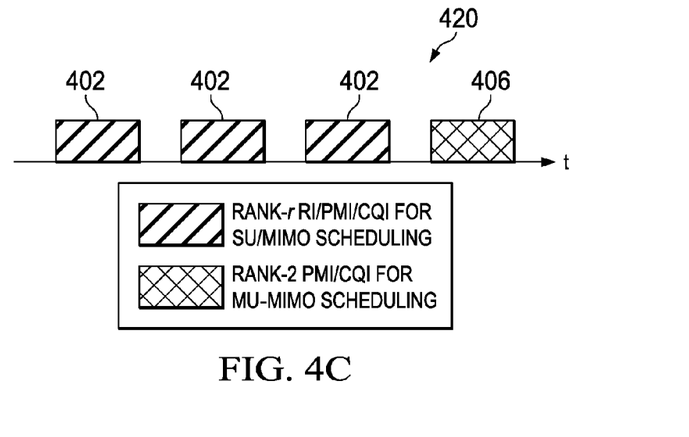

FIGS. 4A-4C show time charts 400, 410 and 420 for multi-rank PMI feedback reporting in accordance with embodiments of the disclosure. In the time chart 400 of FIG. 4A, three rank-r RI/PMI/CQI reports 402 are transmitted followed by a single rank-1 PMI/CQI report 404. In other words, the multi-rank/rank-restricted PMI report (rank-1 and/or rank-2) periodicity is three times that of the regular non-restricted PMI/CQI feedback (rank-r) for SU-MIMO transmission. In the time chart 410 of FIG. 4B, three rank-r RI/PMI/CQI reports 402 are transmitted followed by a single rank-1 PMI/CQI report 404 and a single rank-2 PMI/CQI report 406. Hence, the multi-rank (rank-1 and/or 2) and regular rank-r reports have the same reporting periodicities. In the time chart 420 of FIG. 4C, three rank-r RI/PMI/CQI reports 402 are transmitted followed by a single rank-2 PMI/CQI report 406. The time charts 400, 410 and 420 of FIGS. 4A-4C are examples only. Accordingly, multi-rank PMI feedback reporting embodiments are not intended to be limited to these examples of FIGS. 4A-4C. In alternative embodiments of multi-rank PMI feedback reporting, the order and quantity of different reports may vary. Further, some reports may combine rank-r RI/PMI/CQI information as well as rank-1 and/or rank-2 PMI/CQI information.

Figure 5:
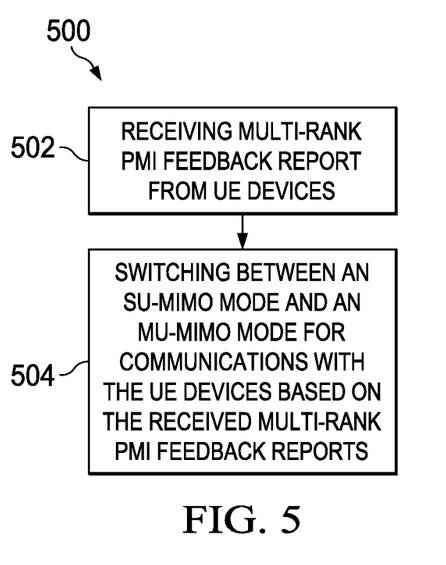
FIG. 5 shows a method in accordance with an embodiment of the disclosure.

FIG. 5 shows a method 500 in accordance with an embodiment of the disclosure. In at least some embodiments, the method 500 is performed by a MIMO base station. As shown, the method 500 comprises receiving multi-rank PMI feedback reports from UE devices (block 502). Receiving multi-rank PMI feedback reports as in block 502 may comprise, for example, receiving a multi-rank PMI feedback report with a rank-r PMI more often than receiving a multi-rank PMI feedback report with a rank-1 PMI or rank-2 PMI. Additionally or alternatively, receiving multi-rank PMI feedback reports as in block 502 may comprise receiving a multi-rank PMI feedback report with rank-r RI/PMI/CQI information as well as rank-1 and/or rank-2 PMI/CQI information. The method 500 also comprises switching between an SU-MIMO mode and an MU-MIMO mode for communications with the UE devices based on the received multi-rank PMI feedback reports (block 504).

In at least some embodiments, the method 500 may additionally comprise selecting one type among a plurality of types of multi-rank PMI feedback reports to receive from the UE devices. The method 500 may additionally comprise transmitting a control signal to the UE devices to notify the UE devices regarding the selected type of multi-rank PMI feedback reports.

In this disclosed embodiments, a multi-rank PMI/CQI feedback scheme is implemented, where PMI/CQI of different ranks are jointly reported to enable dynamic SU/MU switching. More specifically, a rank-r PMI/CQI may be reported to enable SU-MIMO transmissions where r is the preferred SU-MIMO rank. Further, a rank-1 (or rank 1/2 combination) PMI/CQI is reported to enable MU-MIMO transmission with ZFBF. The rank-1 PMI/CQI is essentially a LTE Release 8 SU-MIMO type of PMI/CQI (restricted within rank-1 codebook) without any MU-MIMO hypothesis. This is already supported with codebook subset restriction in LTE Release 8. Further, the rank-1 PMI/CQI can be reported less frequently than the rank-r PMI/CQI due to the typical local-area setup of MU-MIMO. The proposed method provides a very low-complexity and straightforward extension of the existing LTE Release 8 implicit CSI feedback framework to enable dynamic SU/MU switching. The disclosed multi-rank PMI/CQI feedback scheme can be implemented while maintaining a very low feedback overhead with the benefits of minimal standardization impact and marginal cost of UE complexity.

The above discussion is meant to be illustrative of the principles and various embodiments of the present invention. Many modifications and other embodiments of the invention will come to mind to one skilled in the art to which this invention pertains having the benefit of the teachings presented in the foregoing descriptions, and the associated drawings. For example, the Therefore, it is to be understood that the invention is not to be limited to the specific embodiments disclosed. Although specific terms are employed herein, they are used in a generic and descriptive sense only and not for purposes of limitation.

What is claimed is:

1. An electronic device, comprising:
   at least a first antenna;
   multiple-input multiple-output (MIMO) transceiver logic coupled to the at least first antenna; and
   multi-rank precoding matrix indicator (PMI) feedback reporting logic coupled to the MIMO transceiver logic, wherein the multi-rank PMI feedback reporting logic enables the electronic device to selectively switch between a single-user (SU)-MIMO mode and a multiple- user (MU)-MIMO mode;

wherein the multi-rank PMI feedback reporting logic generates a report comprising:

a first PMI corresponding to a recommended precoding matrix for SU-MIMO communications between a MIMO base station and the electronic device, and a rank indicator (RI) corresponding to the rank value of the first PMI, and a second PMI corresponding to a precoding matrix of a pre-defined restricted rank value applicable for MU-MIMO communications between the MIMO base station and the electronic device.

2. The electronic device of claim 1 wherein the multi-rank PMI feedback reporting logic is configured to report said first and second PMIs periodically, wherein the reporting periodicity of said second PMI is not equal to the reporting periodicity of said first PMI.

3. The electronic device of claim 1 wherein the multi-rank PMI feedback reporting logic is configured to generate report with said pre-defined restricted rank value in accordance with a previously received higher layer control signal.

4. The electronic device of claim 1 wherein the multi-rank PMI feedback reporting logic receives reporting instructions for said first PMI and said second PMI, and wherein said reporting instructions are jointly encoded in a UE-specific higher-layer control signal.

5. The electronic device of claim 1, wherein the electronic device is configured to select use of one multi-rank PMI feedback reporting configuration among a plurality of multi-rank PMI feedback reporting configurations.

6. A method, comprising:

receiving, by a multiple-input multiple-output (MIMO) base station, multi-rank precoding matrix indicator (PMI) feedback from at least one MIMO user equipment (UE) device; and switching, by the MIMO base station, between a single-user (SU)-MIMO mode and a multiple-user (MU)-MIMO mode for communications with a first MIMO UE device based on the received multi-rank PMI feedback;

wherein receiving multi-rank PMI feedback comprises receiving:

a first PMI corresponding to a recommended precoding matrix for SU-MIMO communications between the MIMO base station and at least one MIMO UE device, and a rank indicator (RI) corresponding to the rank value of the first PMI, and a second PMI corresponding to a precoding matrix of a pre-defined restricted rank value applicable for MU-MIMO communications between the MIMO base station and at least one MIMO UE device.

7. The method of claim 6 wherein receiving multi-rank PMI feedback comprises receiving said first and second PMIs periodically, wherein the reporting periodicity of said second PMI is not equal to the reporting periodicity of said first PMI.

8. The method of claim 6 further comprising transmitting a higher layer control signal to configure use of said pre-defined restricted rank value for said multi-rank PMI feedback.

9. The method of claim 6 further comprising encoding, in a UE-specific higher-layer control signal, the reporting configuration for said first PMI and said second PMI.

* * * * *